June 30, 1931.  H. L. MASON  1,812,104
STOP VALVE FOR STEAM OR OTHER FLUIDS AND LIQUIDS
Original Filed Nov. 24, 1926
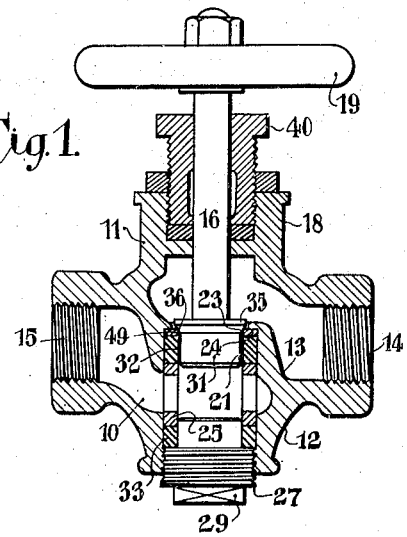
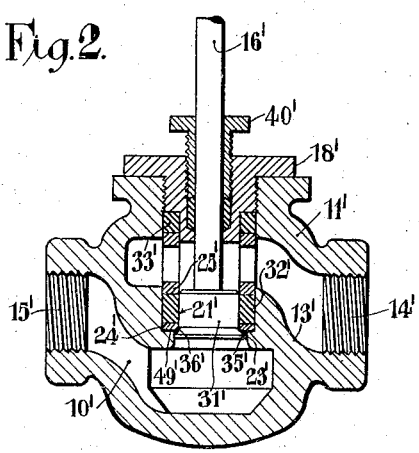
Inventor
HAROLD LYALL MASON,
By
Toulmin & Toulmin
ATTORNEYS Patented June 30, 1931

1,812,104

UNITED STATES PATENT OFFICE

HAROLD LYALL MASON, OF LONDON, ENGLAND

STOP VALVE FOR STEAM OR OTHER FLUIDS AND LIQUIDS

Original application filed November 24, 1926, Serial No. 150,590, and in Great Britain December 1, 1925. Divided and this application filed August 24, 1929. Serial No. 388,168.

This application is a division of my application for stop valves for steam or other fluids and liquids filed 24th of November 1926, Serial No. 150,590.

This invention relates to stop valves for steam and other fluids and liquids.

The invention, while applicable to valves in general, is very suitable for a known class typifiable by the construction wherein the fluid or liquid passage is controlled by a piston which is designed to constitute the valve proper, is assembled in a cylindrical boring of the valve casing, and is packed by elastic rings inserted in the boring in spaced relation effected by a rigid annular member having openings in its wall composing a part of the fluid or liquid passage, the innermost ring being positioned between a seat in the diaphragm or bridge of the valve casing and the corresponding end of the annular member, and the other ring being positioned between the adjacent end of the annular member and a gland at the outer end of the boring. Thus the rings are simultaneously adjustable to tighten or slacken them through the agency of the gland and the interposed annular member, the said annular member serving the dual purpose of a distance-piece to the rings and a pressure-transmitting means to one of them.

An object of the present invention is to provide a valve seating member which avoids distorting influences and is adapted to accommodate itself to the valve in co-operating therewith.

Another object of the present invention is to provide a simple method of removing the working and wearing parts from the valves of the above and other types and of replacing them without trouble or disturbance to other parts.

A further object of my invention is to supply a packing unit comprising an annular member designed to receive and carry the packing proper in single or multiple form; thus, in other words, this member may constitute a vehicle for a packing ring or two or more such rings, simplicity, compactness and variety of applications resulting therefrom.

The invention consists in a valve for steam and other fluids and liquids having an annular seating member in the form of a ring or washer supported and rendered fluid tight by an adjustable yielding packing and forming the end of the packing unit and abutting on the diaphragm of the valve, the opening in the diaphragm being slightly enlarged to allow of the seating ring or washer overlapping the opening, the annular seating member and packing being so disposed within a gland that when the gland is loosened or opened pressure on the seating member by movement of the valve member beyond the closing position is capable of partially or wholly displacing the seating member and its supporting packing.

The accompanying drawings illustrate the application of the invention to two forms of valve, in sectional elevation;

Fig. 1 shows one form;
Fig. 2 shows a modification.

According to one arrangement in the form of a vertical structure wherein the valve proper is of the solid piston type, as shown in Fig. 1, I employ a casing comprising a chamber 10 and two cylindrical portions 11 and 12 integral therewith and projecting centrally thereof, one at the top and the other at the bottom in axial alignment.

These cylindrical portions 11 and 12, which form extensions of the chamber 10, communicate directly with the chamber 10 equipped with the customary bridge or diaphragm 13 for dividing the outlet and the inlet connections 14 and 15 respectively of the casing. The internal diameter of the extensions 11 and 12 is greater than that of the piston 31 and of the spindle 16, which projects through and beyond the upper extension 11 whose end is designed to form a stuffing box 18 and a gland 40 wherethrough the spindle 16 projects for operation in known fashion as depicted at 19. The diaphragm or bridge 13 of the chamber 10 has the usual boring 21 which is made concentric with and of larger diameter than the piston 31. The boring 21 is of two diameters, that at the top being the smaller so that a shoulder 23 results intermediate of its ends. The purpose of this shoulder 23 is to constitute an abutment to a washer 24, an independent member forming a loose end to an annular member 25 which fits finely into the larger portion of the boring 21, and is of such length that its other end lies within the lower extension 12 of the chamber 10, this end being in one with the body. The member 25, together with a closure 27, is applied within the extension 12 by insertion from its end. The closure 27, is appropriately of the screw-plug variety with a polygonal operating head 29. The piston 31 on the spindle 16 is adapted to be inserted into and withdrawn from the end of the member 25 to close and open the connection.

For maintaining a fluid-tight joint between the piston 31 and the member 25, the member 25 is provided with packing 32 of suitable kind. Similarly, for maintaining a fluid-tight joint between the annular member 25 and the cylindrical extension 12 of the casing, packing 33 is inserted. It will thus be seen that on appropriately operating the closure 27 at the end of the under extension 12 of the chamber 10, both sets of packing 32 and 33 are simultaneously adjusted to tighten or slacken them, and that the annular member 25 and its allied packing ring or rings 32 form a unit packing structure capable of various application in all kinds of valves.

The end of the piston 31 and the end of the annular member 25 with which it co-operates are of the same diameter, but immediately beyond this end the piston 31 is increased in diameter so that the piston 31 is provided with a flange or collar 35 forming a continuous shoulder. The collar or flange 35 is adapted to function as a valve simultaneously with piston 31. The flange or collar 35 is formed with a mitred head, one part 36 of which is adapted to co-act with a seat 49 provided on the washer 24, hereinafter referred to as an independent member, associated with the packing member 25.

In operation in the position illustrated, the piston 31 and the head 35 operate simultaneously as a common valve, whilst when it is required to renew the packing, the plug 27 having been withdrawn the spindle is operated to press the valve downwardly which has the effect of depressing the ring 24 and loosening the packing.

It will thus be seen that I thus provide in this form of the invention, an annular member 24 in the form of a ring or washer forming the end of the packing unit and abutting on the diaphragm 13 of the valve, the hole thereof being slightly enlarged to allow of the ring or washer overlapping the opening 21. By forming projection 35 on the piston 31 which forms the valve member, when the lower gland 27 is loosened or removed, and by continuing the closure of the valve beyond the normal point, the packing rings 32, 33, in the body of the valve can be loosened and wholly or partially removed, thus dispensing with the use of a special tool for the purpose and effecting the removal of the packing rings 32, 33, without the need of removing the operating spindle or the body of the valve from their places. Moreover the invention is also applicable to the packing unit for piston valves as described in my patent specification No. 1,715,665.

In the form illustrated in Fig. 2, the packing ring $32^1$ of compressible material acts as a seating for the piston and as a backing for the annular seating washer $24^1$, in order to prevent the passage of fluid round or behind it. Flange or collar $35^1$ is seated at $49^1$ on ring $24^1$, so that when the stuffing box $18^1$ and gland $40^1$ are removed a pull from the lower side of the valve will easily cause the valve to eject seating $49^1$ and packings $32^1$, $33^1$. Here again a very easy and certain way has been provided of changing valve and seating or taking them out for inspection in a short time, even after a very long service.

In most features the structure resembles that in the previous case.

The casting comprises a chamber $10^1$, and cylindrical portion $11^1$, integral therewith with the customary bridge or diaphragm $13^1$, for dividing the inlet and outlet connections $14^1$, and $15^1$, respectively of the casing. The internal diameter of the extension $11^1$, is greater than that of the piston $31^1$, and of the spindle $16^1$, which projects through and beyond the upper extension $11^1$, which is provided with a stuffing box $18^1$, and gland $40^1$, wherethrough the spindle $16^1$, projects for operation in known fashion. The diaphragm or bridge $13^1$, of the chamber $10^1$, has the usual boring $21^1$, which is made concentric with and of larger diameter than the piston $31^1$. The boring $21^1$, is of two diameters, that at the bottom being smaller so that a shoulder $23^1$, results intermediate its ends. The member $25^1$, is applied within the extension $11^1$, by insertion from its end; collar $35^1$, is formed with a mitred head $36^1$, part of which is adapted to co-act with a seat $49^1$, provided in the washer $24^1$, the independent member associated with the packing $32^1$.

What I claim and desire to secure by Letters Patent is:

1. A valve for steam and other fluids having an annular seating member in the form of a ring or washer supported and rendered fluid tight by an adjustable yielding packing compressible from without and forming the end of the packing unit and abutting on the diaphragm of the valve, the opening in the diaphragm being slightly enlarged to allow of the seating ring or washer overlapping the opening, the annular seating member and packing being so disposed relative to a gland that when the gland is loosened or opened pressure on the seating member by movement in a direction of the valve member beyond its closing position is capable of partially or wholly displacing the seating member and its supporting packing.

2. A valve for steam and other fluids having an annular seating member in the form of a ring or washer supported and rendered fluid tight by an adjustable yielding packing compressible from without and forming the end of the packing unit and abutting on the diaphragm of the valve, the opening in the diaphragm being slightly enlarged to allow of the seating ring or washer overlapping the opening, the annular seating member and packing being so disposed relative to a gland that when the gland is loosened or opened pressure on the seating member by movement towards the gland of the valve member beyond its closing position is capable of partially or wholly displacing the seating member and its supporting packing.

3. A valve for steam and other fluids having an annular seating member in the form of a ring or washer supported and rendered fluid tight by an adjustable yielding packing compressible from without and forming the end of the packing unit and abutting on the diaphragm of the valve, the opening in the diaphragm being slightly enlarged to allow of the seating ring or washer overlapping the opening, the annular seating member and packing being so disposed relative to a gland that when the gland is loosened or opened pressure on the seating member by movement of the valve member in a downward direction beyond its closing position is capable of partially or wholly displacing the seating member and its supporting packing, the annular seating member being of the same width as the packing in a direction transverse to the axis of the spindle of the valve when the packing is uncompressed.

4. A valve for steam and other fluids having an annular seating member in the form of a ring or washer supported and rendered fluid tight by an adjustable yielding packing compressible from without and forming the end of the packing unit and abutting on the diaphragm of the valve, the opening in the diaphragm being slightly enlarged to allow of the seating ring or washer overlapping the opening, the annular seating member and packing being so disposed relative to a gland that when the gland is loosened or opened pressure on the seating member by movement of the valve member beyond the closing position of the valve member is capable of partially or wholly displacing the seating member, the seating member being retained in position by pressure from the gland.

In witness whereof I affix my signature.

HAROLD LYALL MASON.